US012043735B2

(12) United States Patent
Isitman et al.

(10) Patent No.: US 12,043,735 B2
(45) Date of Patent: Jul. 23, 2024

(54) RESIN MODIFIED OIL EXTENDED RUBBER

(71) Applicant: THE GOODYEAR TIRE & RUBBER COMPANY, Akron, OH (US)

(72) Inventors: Nihat Ali Isitman, Hudson, OH (US); Robert Alan Woloszynek, Brunswick, OH (US); Joseph John Kulig, Tallmadge, OH (US); Hannah Long, Wadsworth, OH (US); Manuela Pompei, Reuler (LU); Jennifer Labbe, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/962,638

(22) Filed: Oct. 10, 2022

(65) Prior Publication Data

US 2023/0046273 A1    Feb. 16, 2023

Related U.S. Application Data

(62) Division of application No. 16/570,261, filed on Sep. 13, 2019, now Pat. No. 11,505,683.

(60) Provisional application No. 62/730,786, filed on Sep. 13, 2018.

(51) Int. Cl.
*C08L 7/00* (2006.01)
*B60C 1/00* (2006.01)
*B60C 11/00* (2006.01)
*C08L 9/06* (2006.01)

(52) U.S. Cl.
CPC ............ *C08L 7/00* (2013.01); *B60C 1/0016* (2013.01); *B60C 11/0008* (2013.01); *C08L 9/06* (2013.01); *B60C 2011/0025* (2013.01); *C08L 2205/025* (2013.01); *C08L 2205/035* (2013.01); *C08L 2207/322* (2013.01)

(58) Field of Classification Search
CPC ........ C08L 7/00; C08L 9/06; C08L 2205/025; C08L 2205/035; C08L 2207/322; B60C 1/0016; B60C 11/0008; B60C 2011/0025
See application file for complete search history.

(56) References Cited

U.S. PATENT DOCUMENTS

| | | |
|---|---|---|
| 2,964,083 A | 12/1960 | Pfau et al. |
| 3,223,134 A | 12/1965 | Hofmann |
| 3,421,565 A | 1/1969 | Reinbold |
| 3,514,423 A | 5/1970 | Reinbold |
| 3,825,513 A | 7/1974 | Rostler |
| 4,011,178 A | 3/1977 | Muse |
| 4,157,319 A | 6/1979 | Feeney et al. |
| 4,305,962 A | 12/1981 | del Angel |
| 4,375,497 A | 3/1983 | Sandstrom |
| 4,578,411 A | 3/1986 | Budd et al. |
| 4,808,657 A | 2/1989 | Brown |
| 5,227,425 A | 7/1993 | Rauline |
| 5,901,766 A | 5/1999 | Sandstrom |
| 6,977,276 B2 | 12/2005 | Henning et al. |
| 6,984,687 B2 | 1/2006 | Henning et al. |
| 7,919,553 B2 | 4/2011 | Kawasaki et al. |
| 8,022,136 B2 | 9/2011 | Yano et al. |
| 8,044,188 B2 | 10/2011 | Ichtchenko et al. |
| 8,100,157 B2 | 1/2012 | Hattori et al. |
| 9,333,803 B2 | 5/2016 | Izuchi |
| 2003/0153698 A1 | 8/2003 | Halasa et al. |
| 2006/0142145 A1 | 6/2006 | Thiele |
| 2013/0289183 A1 | 10/2013 | Kerns et al. |
| 2014/0135437 A1 | 5/2014 | Sandstrom et al. |
| 2016/0297342 A1 | 10/2016 | Denstaedt |
| 2017/0058112 A1 | 3/2017 | Kerns et al. |
| 2017/0166732 A1 | 6/2017 | Isitiman |
| 2017/0190888 A1 | 7/2017 | Pille-Wolf |

FOREIGN PATENT DOCUMENTS

| | | |
|---|---|---|
| EP | 0359694 A1 | 3/1990 |
| EP | 2412731 A1 | 2/2012 |
| JP | 2004051797 A | 2/2004 |
| JP | 2008156419 A | 7/2008 |
| WO | 2017165499 A1 | 9/2017 |
| WO | 2018004609 A1 | 1/2018 |

OTHER PUBLICATIONS

Partial European Search Report for European Patent Application No. 19194850.4 which is the European counterpart to the subject patent application.

*Primary Examiner* — Angela C Scott
(74) *Attorney, Agent, or Firm* — Alvin T. Rockhill

(57) ABSTRACT

This invention is based upon the unexpected finding that a hydrocarbon traction resin can be dispersed into the oil used in making an oil extended emulsion and solution rubbers to attain improved performance characteristics. For instance, this technique allows for the hydrocarbon traction resin to be incorporated into the rubber at a higher level than would ordinarily be possible using conventional mixing techniques. In tire tread compounds this provides improved wet traction characteristics without compromising cured stiffness (dry traction) and ultimate properties (chip/chunk resistance). This technique can be used to incorporate a resin into virtually any synthetic rubber that can benefit from being oil extended. It is of particular value in making resin modified solution styrene-butadiene rubber (SSBR), emulsion styrene-butadiene rubber (ESBR), high cis-1.4-polybutadiene rubber, and synthetic polyisoprene rubber which are formulated for use in tire tread compounds.

22 Claims, No Drawings

RESIN MODIFIED OIL EXTENDED RUBBER

This application is a divisional of U.S. patent application Ser. No. 16/570,261, filed on Sep. 13, 2019, which claims the benefit of U.S. Provisional Patent Application Ser. No. 62/730,786, filed on Sep. 13, 2018. The teachings of U.S. Provisional Patent Application Ser. No. 62/730,786 are incorporated herein by reference in their entirety.

FIELD OF THE INVENTION

This invention relates to resin modified oil extended rubber compositions and to methods for manufacturing such resin modified oil extended rubber compositions. In a highly preferred embodiment of this invention the resin modified oil extended rubber composition in made utilizing a vegetable oil, such as soybean oil or corn oil.

BACKGROUND OF THE INVENTION

In 1949, Emert S. Pfau, Gilbert H Swart, and Kermit V. Weinstock discovered that high molecular weight rubbers which were too tough to process using ordinary mixing techniques could be "oil extended" to make them capable of being processed without excessive deterioration during mastication procedures. Oil extension accordingly made it possible to use synthetic rubbers having higher molecular weights than could be previously processed in manufacturing rubber products, such as tires, hoses, power transmission belts, conveyor belts, and the like. The ability to use of such high molecular weight rubbers in manufacturing such products resulted in improved product performance characteristics, such as reduced hysteresis, and in reduced production costs. In 1950, Pfau et al filed a United States Patent Application covering their invention which ultimately issued as U.S. Pat. No. 2,964,083, on Dec. 13, 1960. Since that time oil extension has been widely used to make high molecular weight synthetic rubbers capable of being processed.

Oil extended rubber is generally defined as a synthetic rubber or elastomer into which 25% to 50% of a petroleum oil emulsion has been incorporated to decrease cost and to increase low-temperature flexibility and resilience. Synthetic rubber made by emulsion polymerization or solution polymerization can be oil extended to attain desired benefits. For example, extending oil can be added to the cement of a synthetic rubber made by solution polymerization before it is recovered from the solvent in which it was synthesized. Upon subsequent removal of the solvent the extending oil will remain in the synthetic rubber to provide it with the benefits of being oil extended. By the same token, synthetic rubber made by emulsion polymerization can be oil extended by mixing an emulsion of the extender oil into the latex of the emulsion rubber before it is coagulated. Again, the extender oil remains in the rubber phase making the synthetic rubber more capable of being processed using conventional equipment and techniques.

High molecular weight uncured synthetic rubbers have characteristics that make them highly desirable for utilization in manufacturing a variety of rubber products, such as tires, power transmission belts, hoses, windshield wiper blades, sole soles, and the like. To make such high molecular weight rubbers easier to process or capable of being processed at all in commercial equipment the high molecular weight rubber is frequently oil extended. As was previously noted, oil extended rubber are not a susceptible to degradation during mixing procedures which also provides them with better characteristics in final product applications. In any case, oil extension is conventionally used in making synthetic rubbers for a wide variety of applications to make them more readily capable of being processed (mixed into other rubbers and rubber compounding materials) and to attain an array of beneficial properties that could not otherwise be attained.

Since the 1960s, a wide variety of synthetic rubbers have been oil extended to improve their ability to be processed and to improve their ultimate performance in rubber products, such as tires, power transmission belts, conveyor belts, tracks, air springs, asphalt modification polymers, adhesives, shoe soles, windshield wiper blades, bowling balls, golf balls, energy absorbing foot pads, and the like. Oil extension has been applied to a wide variety of synthetic rubbers and is of particular benefit in high molecular weight rubbers (rubbery having a high Mooney viscosity). For instance, some representative examples of synthetic rubbers that have been oil extended include high cis-1.4-polybutadiene rubber, emulsion styrene-butadiene rubber, solution styrene-butadiene rubber, synthetic polyisoprene rubber, styrene-isoprene-butadiene rubber, and nitrile rubber. Petroleum based oils have traditionally been used in preparing the oil extended rubber. These petroleum based oils include aromatic oils, naphthenic oils, paraffinic oils, and mixtures thereof. These petroleum based extending oils are classified under ASTM Designation D2226 as being highly aromatic, aromatic, naphthenic, or paraffinic according to the following table:

| ASTM Type | Asphaltenes | Polar Compounds | Saturated Hydrocarbons |
|---|---|---|---|
| 101 | ≤0.75% | ≤25% | ≤20% |
| 102 | ≤0.5% | ≤12% | 20.1% to 35% |
| 103 | ≤0.3% | ≤6% | 35.1% to 65% |
| 104 | ≤0.1% | ≤1% | ≥65% |

It has recently been reported in United States Patent Publication 2017/0058112 A1 that the use of a triglyceride oil, such as, soybean oil, in the extension of high molecular weight solution styrene-butadiene rubber unexpectedly reduces the Mooney viscosity of such rubbers to a greater extent than does the use of petroleum based extending oils. This results in significantly lower viscosity for such uncured solution styrene/butadiene rubber (SSBR) and thereby enables processing of even higher molecular weight (even higher Mooney viscosity) SSBR. It is considered that such obtained lower viscosity for the uncured SSBR is both significantly advantageous and appeared to be essential to enable suitable processing for the SSBR at both the rubber manufacturing facility and at a rubber composition preparation facility, such as a tire manufacturing plant. Accordingly, it was reported that utilization of soybean oil in place of petroleum oil in oil extending high molecular weight solution styrene-butadiene rubber results in better processing and promotes better physical properties in the rubber product ultimately being manufactured. In any case, triglyceride oils can be used in oil extending high molecular weight solution styrene-butadiene rubber for use in a wide array of products, such as tires, power transmission belts, conveyor belts, tracks, air springs, asphalt modification polymers, adhesives, shoe soles, windshield wiper blades, bowling balls, golf balls, energy absorbing foot pads, vibration dampening pads, seals, gaskets, and the like. Such oil extended solution styrene-butadiene rubbers are of particular importance in making rubber formulations for tire tread and tire sidewall applications.

U.S. Pat. No. 8,044,188 discloses the use of vegetable oils having an iodine value of not less than 135, such as linseed oil, tung oil, safflower oil, and terpenes (α-pinene, β-pinene, limonene, and turpentine oil) in the oil extension of certain modified natural rubber lattices. The use of these vegetable oils in place of petroleum based oils is touted in this patent as being beneficial for environmental reasons and because they are renewable resources.

Historically, vegetable oils, such as soybean oil and corn oil have been used for mixing with various rubber compositions by free oil addition to the rubber composition rather than oil extension of the elastomer at its point of manufacture. For instance, the utilization of soybean oil in rubber formulations is described in U.S. Pat. Nos. 7,919,553, 8,100, 157, and 8,022,136.

SUMMARY OF THE INVENTION

This invention is based upon the unexpected finding that a hydrocarbon traction resin can be dispersed into the oil used in making an oil extended emulsion and solution rubbers to attain improved performance characteristics. For instance, this technique allows for the hydrocarbon traction resin to be incorporated into the rubber at a higher level than would ordinarily be possible using conventional mixing techniques. In tire tread compounds this provides improved wet traction characteristics without compromising cured stiffness (dry traction) and ultimate properties (chip/chunk resistance). This technique can be used to incorporate a resin into virtually any synthetic rubber that can benefit from being oil extended. More specifically, this invention is applicable to making resin modified oil extended rubbers which are comprised of solution styrene-butadiene rubber (SSBR), emulsion styrene-butadiene rubber (ESBR), polybutadiene rubber, synthetic polyisoprene rubber, ethylene-propylene-diene rubber (EPDM), isoprene-butadiene rubber, styrene-isoprene-butadiene rubber, silicon rubber, nitrile rubber, carboxylated nitrile rubber, and the like. It is of particular value in making resin modified solution styrene-butadiene rubber (SSBR), emulsion styrene-butadiene rubber (ESBR), high cis-1.4-polybutadiene rubber, and synthetic polyisoprene rubber which are formulated for use in tire tread compounds.

The present invention more specifically reveals a method for preparing a resin modified oil extended rubber composition comprising: (1) blending an oil composition into a rubber cement, wherein the resin modified oil extended rubber composition is comprised of an oil and a hydrocarbon resin, and (2) recovering the resin modified oil extended rubber from the rubber cement.

The subject invention also discloses a method for preparing a resin modified emulsion rubber composition, said method comprising: (1) blending an oil composition into a rubber emulsion, wherein the oil composition is comprised of an oil and a hydrocarbon resin, and (2) recovering the resin modified rubber from the rubber emulsion.

The present invention further discloses a high cis-1,4-polybutadiene rubber composition which is comprised of high cis-1,4-polybutadiene rubber having a cis-microstructure content of at least 90 percent, at least 5 phr of an oil, and at least 5 phr of a resin, wherein the high cis-1,4-polybutadiene rubber has a $M_z$ molecular weight of at least 750,000 Da, and wherein the high cis-1,4-polybutadiene rubber has a ratio of $M_z$ molecular weight to number average molecular weight of at least 5. Such high cis-1,4-polybutadiene rubber will typically be free of fillers, curatives, accelerators, and other rubber compounding agents with the exception of antidegredants, such as antioxidants and antiozonants.

The subject invention additionally reveals a synthetic polyisoprene rubber composition which is comprised of high cis-polyisoprene rubber having a cis-microstructure content of at least 90 percent, at least 5 phr of an oil, and at least 5 phr of a resin, wherein the high cis-polyisoprene rubber has a $M_z$ molecular weight of at least 750,000 Da, and wherein the high cis-polyisoprene rubber has a ratio of Mz molecular weight to number average molecular weight of at least 2.7. Such high cis-polyisoprene rubber will typically be free of fillers, curatives, accelerators, and other rubber compounding agents with the exception of antidegredants, such as antioxidants and antiozonants.

The present invention also discloses an emulsion styrene-butadiene rubber composition which is comprised of an emulsion styrene-butadiene rubber, a at least 5 phr of an oil, and at least 5 phr of a resin, wherein the emulsion styrene-butadiene rubber has a bound styrene content which with is within the range of 22 percent to 60 weight percent and a bound butadiene content which is within the range of 40 weight percent to 78 weight percent, wherein 60 percent to 70 percent of the bound butadiene repeat units in the emulsion styrene-butadiene rubber are of trans 1,4-microstructure, wherein 13 percent to 23 percent of the bound butadiene repeat units in the emulsion styrene-butadiene rubber are of cis-microstructure, and wherein 12 percent to 22 percent of the bound butadiene repeat units in the emulsion styrene-butadiene rubber are of vinyl-microstructure, wherein the emulsion styrene-butadiene rubber has a $M_z$ molecular weight of at least 15,000 kDa, and wherein the emulsion styrene-butadiene rubber has a ratio of Mz molecular weight to number average molecular weight of at least 50. Such emulsion styrene-butadiene rubber will typically be free of fillers, curatives, accelerators, and other rubber compounding agents with the exception of antidegredants, such as antioxidants and antiozonants.

The present invention further reveals a solution styrene-butadiene rubber composition which is comprised of a solution styrene-butadiene rubber, at least 5 phr of an oil, and at least 5 phr of a resin, wherein the solution styrene-butadiene rubber has a bound styrene content which with is within the range of 10 percent to 60 weight percent and a bound butadiene content which is within the range of 40 weight percent to 90 weight percent, wherein 30 percent to 55 percent of the bound butadiene repeat units in the solution styrene-butadiene rubber are of trans 1,4-microstructure, wherein 25 percent to 50 percent of the bound butadiene repeat units in the solution styrene-butadiene rubber are of cis-microstructure, and wherein 5 percent to 45 percent of the bound butadiene repeat units in the solution styrene-butadiene rubber are of vinyl-microstructure, wherein the solution styrene-butadiene rubber has a $M_z$ molecular weight of at least 800 kDa, and wherein the solution styrene-butadiene rubber has a ratio of Mz molecular weight to number average molecular weight of at least 1.58. Such solution styrene-butadiene rubber will typically be free of fillers, curatives, accelerators, and other rubber compounding agents with the exception of antidegredants, such as antioxidants and antiozonants.

The subject invention also discloses a tire which is comprised of a generally toroidal-shaped carcass with an outer circumferential tread, two sidewalls, two spaced beads, at least one ply extending from bead to bead and sidewalls extending radially from and connecting said tread to said beads, wherein said tread is adapted to be ground-contacting, and wherein at least one component of said tire is comprised of a high cis-1,4-polybutadiene rubber composition which is comprised of high cis-1,4-polybutadiene rubber having a cis-microstructure content of at least 90 percent, at least 5 phr of an oil, and at least 5 phr of a resin, wherein the high cis-1,4-polybutadiene rubber has a $M_z$ molecular weight of at least 750,000 Da, and wherein the high cis-1,4-polybutadiene rubber has a ratio of Mz molecular weight to number average molecular weight of at least 5. It is particularly advantageous to include the high cis-1,4-polybutadiene rubber in the tread and/or the sidewalls of such tires.

The subject invention further discloses a tire which is comprised of a generally toroidal-shaped carcass with an outer circumferential tread, two sidewalls, two spaced beads, at least one ply extending from bead to bead and sidewalls extending radially from and connecting said tread to said beads, wherein said tread is adapted to be ground-contacting, and wherein at least one component of said tire is comprised of a synthetic polyisoprene rubber composition which is comprised of high cis-polyisoprene rubber having a cis-microstructure content of at least 90 percent, at least 5 phr of an oil, and at least 5 phr of a resin, wherein the high cis-polyisoprene rubber has a $M_z$ molecular weight of at least 750,000 Da, and wherein the high cis-1,4-polybutadiene rubber has a ratio of Mz molecular weight to number average molecular weight of at least 2.7. It is particularly advantageous to include the high cis-polyisoprene rubber in the tread and/or the sidewalls of such tires.

The present invention also discloses a tire which is comprised of a generally toroidal-shaped carcass with an outer circumferential tread, two sidewalls, two spaced beads, at least one ply extending from bead to bead and sidewalls extending radially from and connecting said tread to said beads, wherein said tread is adapted to be ground-contacting, and wherein at least one component of said tire is comprised of an emulsion styrene-butadiene rubber composition which is comprised of an emulsion styrene-butadiene rubber, a at least 5 phr of an oil, and at least 5 phr of a resin, wherein the emulsion styrene-butadiene rubber has a bound styrene content which is within the range of 22 percent to 60 weight percent and a bound butadiene content which is within the range of 40 weight percent to 78 weight percent, wherein 60 percent to 70 percent of the bound butadiene repeat units in the emulsion styrene-butadiene rubber are of trans 1,4-microstructure, wherein 13 percent to 23 percent of the bound butadiene repeat units in the emulsion styrene-butadiene rubber are of cis-microstructure, and wherein 12 percent to 22 percent of the bound butadiene repeat units in the emulsion styrene-butadiene rubber are of vinyl-microstructure, wherein the emulsion styrene-butadiene rubber has a $M_z$ molecular weight of at least 25,000 kDa, and wherein the emulsion styrene-butadiene rubber has a ratio of Mz molecular weight to number average molecular weight of at least 150. It is particularly advantageous to include the emulsion styrene-butadiene rubber in the tread and/or the sidewalls of such tires.

The present invention further reveals a tire which is comprised of a generally toroidal-shaped carcass with an outer circumferential tread, two sidewalls, two spaced beads, at least one ply extending from bead to bead and sidewalls extending radially from and connecting said tread to said beads, wherein said tread is adapted to be ground-contacting, and wherein at least one component of said tire is comprised of a solution styrene-butadiene rubber composition which is comprised of a solution styrene-butadiene rubber, at least 5 phr of an oil, and at least 5 phr of a resin, wherein the solution styrene-butadiene rubber has a bound styrene content which with is within the range of 10 percent to 60 weight percent and a bound butadiene content which is within the range of 40 weight percent to 90 weight percent, wherein 30 percent to 55 percent of the bound butadiene repeat units in the solution styrene-butadiene rubber are of trans 1,4-microstructure, wherein 25 percent to 50 percent of the bound butadiene repeat units in the solution styrene-butadiene rubber are of cis-microstructure, and wherein 5 percent to 45 percent of the bound butadiene repeat units in the solution styrene-butadiene rubber are of vinyl-microstructure, wherein the solution styrene-butadiene rubber has a $M_z$ molecular weight of at least 800 kDa, and wherein the solution styrene-butadiene rubber has a ratio of Mz molecular weight to number average molecular weight of at least 1.58. It is particularly advantageous to include the emulsion styrene-butadiene rubber in the tread and/or the sidewalls of such tires.

The subject invention also discloses a power transmission belt which is comprised of a compression section, a tension section, and a load carrying section, wherein at least one component of said power transmission belt is comprised of a high cis-1,4-polybutadiene rubber composition which is comprised of high cis-1,4-polybutadiene rubber having a cis-microstructure content of at least 90 percent, at least 5 phr of an oil, and at least 5 phr of a resin, wherein the high cis-1,4-polybutadiene rubber has a $M_z$ molecular weight of at least 750,000 Da, and wherein the high cis-1,4-polybutadiene rubber has a ratio of Mz molecular weight to number average molecular weight of at least 5.

The subject invention also discloses a power transmission belt which is comprised of a compression section, a tension section, and a load carrying section, wherein at least one component of said power transmission belt is comprised of a synthetic polyisoprene rubber composition which is comprised of high cis-polyisoprene rubber having a cis-microstructure content of at least 90 percent, at least 5 phr of an oil, and at least 5 phr of a resin, wherein the high cis-polyisoprene rubber has a $M_z$ molecular weight of at least 750,000 Da, and wherein the high cis-1,4-polybutadiene rubber has a ratio of Mz molecular weight to number average molecular weight of at least 2.7.

The subject invention also discloses a power transmission belt which is comprised of a compression section, a tension section, and a load carrying section, wherein at least one component of said power transmission belt is comprised of an emulsion styrene-butadiene rubber composition which is comprised of an emulsion styrene-butadiene rubber, a at least 5 phr of an oil, and at least 5 phr of a resin, wherein the emulsion styrene-butadiene rubber has a bound styrene content which with is within the range of 22 percent to 60 weight percent and a bound butadiene content which is within the range of 40 weight percent to 78 weight percent, wherein 60 percent to 70 percent of the bound butadiene repeat units in the emulsion styrene-butadiene rubber are of trans 1,4-microstructure, wherein 13 percent to 23 percent of the bound butadiene repeat units in the emulsion styrene-butadiene rubber are of cis-microstructure, and wherein 12 percent to 22 percent of the bound butadiene repeat units in the emulsion styrene-butadiene rubber are of vinyl-microstructure, wherein the emulsion styrene-butadiene rubber has a $M_z$ molecular weight of at least 25,000 kDa, and wherein the emulsion styrene-butadiene rubber has a ratio of Mz molecular weight to number average molecular weight of at least 150.

The subject invention further reveals a power transmission belt which is comprised of a compression section, a tension section, and a load carrying section, wherein at least one component of said power transmission belt is comprised of a solution styrene-butadiene rubber composition which is comprised of a solution styrene-butadiene rubber, at least 5 phr of an oil, and at least 5 phr of a resin, wherein the solution styrene-butadiene rubber has a bound styrene content which with is within the range of 10 percent to 60 weight percent and a bound butadiene content which is within the range of 40 weight percent to 90 weight percent, wherein 30 percent to 55 percent of the bound butadiene repeat units in the solution styrene-butadiene rubber are of trans 1,4-microstructure, wherein 25 percent to 50 percent of the bound butadiene repeat units in the solution styrene-butadiene rubber are of cis-microstructure, and wherein 5 percent to 45 percent of the bound butadiene repeat units in the solution styrene-butadiene rubber are of vinyl-microstructure, wherein the solution styrene-butadiene rubber has a $M_z$ molecular weight of at least 800 kDa, and wherein the solution styrene-butadiene rubber has a ratio of Mz molecular weight to number average molecular weight of at least 1.58.

The subject invention also discloses a conveyor belt which is comprised of a carry cover layer, a reinforcement layer, and a pulley cover layer, wherein at least one component of said conveyor belt is comprised of a high cis-1,4-polybutadiene rubber composition which is comprised of high cis-1,4-polybutadiene rubber having a cis-microstructure content of at least 90 percent, at least 5 phr of an oil, and at least 5 phr of a resin, wherein the high cis-1,4-polybutadiene rubber has a $M_z$ molecular weight of at least 750,000 Da, and wherein the high cis-1,4-polybutadiene rubber has a ratio of Mz molecular weight to number average molecular weight of at least 5. It is particularly advantageous to include the high cis-1,4-polybutadiene rubber in the tread and/or the sidewalls of such tires.

The subject invention also discloses a conveyor belt which is comprised of a carry cover layer, a reinforcement layer, and a pulley cover layer, wherein at least one component of said conveyor belt is comprised of a synthetic polyisoprene rubber composition which is comprised of high cis-polyisoprene rubber having a cis-microstructure content of at least 90 percent, at least 5 phr of an oil, and at least 5 phr of a resin, wherein the high cis-polyisoprene rubber has a $M_z$ molecular weight of at least 750,000 Da, and wherein the high cis-1,4-polybutadiene rubber has a ratio of Mz molecular weight to number average molecular weight of at least 2.7. It is particularly advantageous to include the high cis-polyisoprene rubber in the tread and/or the sidewalls of such tires.

The subject invention also discloses a conveyor belt which is comprised of a carry cover layer, a reinforcement layer, and a pulley cover layer, wherein at least one component of said conveyor belt is comprised of an emulsion styrene-butadiene rubber composition which is comprised of an emulsion styrene-butadiene rubber, a at least 5 phr of an oil, and at least 5 phr of a resin, wherein the emulsion styrene-butadiene rubber has a bound styrene content which with is within the range of 22 percent to 60 weight percent and a bound butadiene content which is within the range of 40 weight percent to 78 weight percent, wherein 60 percent to 70 percent of the bound butadiene repeat units in the emulsion styrene-butadiene rubber are of trans 1,4-microstructure, wherein 13 percent to 23 percent of the bound butadiene repeat units in the emulsion styrene-butadiene rubber are of cis-microstructure, and wherein 12 percent to 22 percent of the bound butadiene repeat units in the emulsion styrene-butadiene rubber are of vinyl-microstructure, wherein the emulsion styrene-butadiene rubber has a $M_z$ molecular weight of at least 25,000 kDa, and wherein the high emulsion styrene-butadiene rubber has a ratio of Mz molecular weight to number average molecular weight of at least 150. It is particularly advantageous to include the emulsion styrene-butadiene rubber in the tread and/or the sidewalls of such tires.

The subject invention also discloses a conveyor belt which is comprised of a carry cover layer, a reinforcement layer, and a pulley cover layer, wherein at least one component of said conveyor belt is comprised of a solution styrene-butadiene rubber composition which is comprised of a solution styrene-butadiene rubber, at least 5 phr of an oil, and at least 5 phr of a resin, wherein the solution styrene-butadiene rubber has a bound styrene content which with is within the range of 10 percent to 60 weight percent and a bound butadiene content which is within the range of 40 weight percent to 90 weight percent, wherein 30 percent to 55 percent of the bound butadiene repeat units in the solution styrene-butadiene rubber are of trans 1,4-microstructure, wherein 25 percent to 50 percent of the bound butadiene repeat units in the solution styrene-butadiene rubber are of cis-microstructure, and wherein 5 percent to 45 percent of the bound butadiene repeat units in the solution styrene-butadiene rubber are of vinyl-microstructure, wherein the solution styrene-butadiene rubber has a $M_z$ molecular weight of at least 800 kDa, and wherein the solution styrene-butadiene rubber has a ratio of Mz molecular weight to number average molecular weight of at least 1.58.

The subject invention also discloses a windshield wiper blade which is comprised of a head, a body, a neck section, a turning section and a lip section, wherein at least one component of said windshield wiper blade is comprised of a high cis-1,4-polybutadiene rubber composition which is comprised of high cis-1,4-polybutadiene rubber having a cis-microstructure content of at least 90 percent, at least 5 phr of an oil, and at least 5 phr of a resin, wherein the high cis-1,4-polybutadiene rubber has a $M_z$ molecular weight of at least 750,000 Da, and wherein the high cis-1,4-polybutadiene rubber has a ratio of Mz molecular weight to number average molecular weight of at least 5. For instance the high cis-1,4-butadiene rubber composition can be used in the head, the body, the neck section, the turning section and/or the lip section of the windshield wiper blade.

The subject invention also discloses a windshield wiper blade which is comprised of a head, a body, a neck section, a turning section and a lip section, wherein at least one component of said windshield wiper blade is comprised of a synthetic polyisoprene rubber composition which is comprised of high cis-polyisoprene rubber having a cis-microstructure content of at least 90 percent, at least 5 phr of an oil, and at least 5 phr of a resin, wherein the high cis-polyisoprene rubber has a $M_z$ molecular weight of at least 750,000 Da, and wherein the high cis-1,4-polybutadiene rubber has a ratio of Mz molecular weight to number average molecular weight of at least 2.7. For instance the synthetic polyisoprene rubber composition can be used in the head, the body, the neck section, the turning section and/or the lip section of the windshield wiper blade.

The subject invention also discloses a windshield wiper blade which is comprised of a head, a body, a neck section, a turning section and a lip section, wherein at least one component of said windshield wiper blade is comprised of an emulsion styrene-butadiene rubber composition which is comprised of an emulsion styrene-butadiene rubber, with at least 5 phr of an oil, and at least 5 phr of a resin, wherein the emulsion styrene-butadiene rubber has a bound styrene content which with is within the range of 22 percent to 60 weight percent and a bound butadiene content which is within the range of 40 weight percent to 78 weight percent, wherein 60 percent to 70 percent of the bound butadiene repeat units in the emulsion styrene-butadiene rubber are of trans 1,4-microstructure, wherein 13 percent to 23 percent of the bound butadiene repeat units in the emulsion styrene-butadiene rubber are of cis-microstructure, and wherein 12 percent to 22 percent of the bound butadiene repeat units in the emulsion styrene-butadiene rubber are of vinyl-microstructure, wherein the emulsion styrene-butadiene rubber has a $M_z$ molecular weight of at least 25,000 kDa, and wherein the emulsion styrene-butadiene rubber has a ratio of Mz molecular weight to number average molecular weight of at least 150. For instance the emulsion styrene-butadiene rubber composition can be used in the head, the body, the neck section, the turning section and/or the lip section of the windshield wiper blade.

The subject invention also discloses a windshield wiper blade which is comprised of a head, a body, a neck section, a turning section and a lip section, wherein at least one component of said windshield wiper blade is comprised of a solution styrene-butadiene rubber composition which is comprised of a solution styrene-butadiene rubber, at least 5 phr of an oil, and at least 5 phr of a resin, wherein the solution styrene-butadiene rubber has a bound styrene content which with is within the range of 10 percent to 60 weight percent and a bound butadiene content which is within the range of 40 weight percent to 90 weight percent, wherein 30 percent to 55 percent of the bound butadiene repeat units in the solution styrene-butadiene rubber are of trans 1,4-microstructure, wherein 25 percent to 50 percent of the bound butadiene repeat units in the solution styrene-butadiene rubber are of cis-microstructure, and wherein 5 percent to 45 percent of the bound butadiene repeat units in the solution styrene-butadiene rubber are of vinyl-microstructure, wherein the solution styrene-butadiene rubber has a $M_z$ molecular weight of at least 800 kDa, and wherein the solution styrene-butadiene rubber has a ratio of Mz molecular weight to number average molecular weight of at least 1.58. For instance the solution styrene-butadiene rubber composition can be used in the head, the body, the neck section, the turning section and/or the lip section of the windshield wiper blade.

The subject invention also discloses a golf ball which is comprised of a core and a cover, wherein the core is comprised of is comprised of a high cis-1,4-polybutadiene rubber composition which is comprised of high cis-1,4-polybutadiene rubber having a cis-microstructure content of at least 90 percent, at least 5 phr of an oil, and at least 5 phr of a resin, wherein the high cis-1,4-polybutadiene rubber has a $M_z$ molecular weight of at least 750,000 Da, and wherein the high cis-1,4-polybutadiene rubber has a ratio of Mz molecular weight to number average molecular weight of at least 5.

The subject invention also discloses a golf ball which is comprised of a core and a cover, wherein the core is comprised of a synthetic polyisoprene rubber composition which is comprised of high cis-polyisoprene rubber having a cis-microstructure content of at least 90 percent, at least 5 phr of an oil, and at least 5 phr of a resin, wherein the high cis-polyisoprene rubber has a $M_z$ molecular weight of at least 750,000 Da, and wherein the high cis-1,4-polybutadiene rubber has a ratio of Mz molecular weight to number average molecular weight of at least 2.7.

The subject invention also discloses a golf ball which is comprised of a core and a cover, wherein the core is comprised of an emulsion styrene-butadiene rubber composition which is comprised of an emulsion styrene-butadiene rubber, a at least 5 phr of an oil, and at least 5 phr of a resin, wherein the emulsion styrene-butadiene rubber has a bound styrene content which with is within the range of 22 percent to 60 weight percent and a bound butadiene content which is within the range of 40 weight percent to 78 weight percent, wherein 60 percent to 70 percent of the bound butadiene repeat units in the emulsion styrene-butadiene rubber are of trans 1,4-microstructure, wherein 13 percent to 23 percent of the bound butadiene repeat units in the emulsion styrene-butadiene rubber are of cis-microstructure, and wherein 12 percent to 22 percent of the bound butadiene repeat units in the emulsion styrene-butadiene rubber are of vinyl-microstructure, wherein the emulsion styrene-butadiene rubber has a $M_z$ molecular weight of at least 25,000 kDa, and wherein the emulsion styrene-butadiene rubber has a ratio of Mz molecular weight to number average molecular weight of at least 150.

The subject invention also discloses a golf ball which is comprised of a core and a cover, wherein the core is comprised of a solution styrene-butadiene rubber composition which is comprised of a solution styrene-butadiene rubber, at least 5 phr of an oil, and at least 5 phr of a resin, wherein the solution styrene-butadiene rubber has a bound styrene content which with is within the range of 10 percent to 60 weight percent and a bound butadiene content which is within the range of 40 weight percent to 90 weight percent, wherein 30 percent to 55 percent of the bound butadiene repeat units in the solution styrene-butadiene rubber are of trans 1,4-microstructure, wherein 25 percent to 50 percent of the bound butadiene repeat units in the solution styrene-butadiene rubber are of cis-microstructure, and wherein 5 percent to 45 percent of the bound butadiene repeat units in the solution styrene-butadiene rubber are of vinyl-microstructure, wherein the solution styrene-butadiene rubber has a $M_z$ molecular weight of at least 800 kDa, and wherein the solution styrene-butadiene rubber has a ratio of Mz molecular weight to number average molecular weight of at least 1.58.

Golf balls having cores made with the rubber compositions of this invention are typically cured using peroxide curative systems. The peroxide used will typically be an organic peroxide, such as dicumyl peroxide, t-butylperoxybenzoate or di-t-butylperoxide. It is normally preferred to use dicumyl peroxide in such golf ball compounds. The peroxide will typically be present in the rubbery component of the golf ball at a level which is within the range of about 0.5 phr to about 3 phr. The peroxide will preferably be present in the rubbery component of the golf ball at a level that is within the range of about 1 phr to about 2.5 phr.

Golf balls can be made using the resin modified emulsion rubbers of this invention in accordance with the teachings of U.S. Pat. No. 6,713,565. Such solid golf balls generally include a core and a resin cover. The solid golf ball design may include a core obtained by one piece molding or be of a multi-piece design where one or more layers are coated onto the core. In any case, such solid golf balls include a resilient portion obtained by vulcanizing the cis-1,4-polybutadiene rubber containing composition which also includes a co-crosslinking agent, and a peroxide.

In addition to the cis-1,4-polybutadiene rubber, the resilient portion of the golf ball may also contain additional rubbers, such as styrene-butadiene rubber, natural rubber, synthetic polyisoprene rubber, styrene-isoprene rubber, and the like. The amount of such additional rubbers that can be included in the resilient portion of the golf ball will normally be no more than about 60 phr (parts per 100 parts by weight of rubber), based upon the total amount of rubber included in the resilient portion of the golf ball. Thus, the resilient portion of the golf ball will normally contain from about 40 phr to 100 phr of the cis-1,4-polybutadiene and from 0 phr to about 60 phr of such additional rubbers. It is normally preferred for such additional rubbers to be present in the resilient portion of the golf ball at a level of no more than about 30 phr. It is normally more preferred for such additional rubbers to be present in the resilient portion of the golf ball at a level of no more than about 15 phr. The co-crosslinking agent used in the resilient portion of the golf ball will typically be an unsaturated carboxylic acid or a metal salt thereof. For example, the co-crosslinking agent can be acrylic acid, methacrylic acid, zinc acrylate, zinc methacrylate or a mixture thereof. The co-crosslinking agent will typically be present in the rubbery component of the golf ball at a level which is within the range of about 15 phr to about 60 phr. The co-crosslinking agent will typically be present in the resilient portion of the golf ball at a level which is within the range of about 25 phr to about 40 phr. The teachings of U.S. Pat. No. 6,713,565 are incorporated herein by reference.

DETAILED DESCRIPTION OF THE INVENTION

Both resin modified oil extended solution rubbers and resin modified emulsion rubbers can be made utilizing the methods of this invention. It should be noted that solution rubbers are rubbery polymers made by solution polymerization in a suitable organic solvent and emulsion rubbers are rubbery polymers made by emulsion polymerization in an aqueous medium. In any case, resin modified solution rubber compositions can be made in accordance with this invention by (1) blending an oil composition into a rubber cement, wherein the oil composition is comprised of an oil and a hydrocarbon resin, and (2) recovering the resin modified oil extended rubber from the rubber cement. On the other hand, resin modified emulsion rubber compositions can be made in accordance with this invention by (1) blending an oil composition into a rubber emulsion, wherein the oil composition is comprised of an oil and a hydrocarbon resin, and (2) recovering the resin modified rubber from the rubber emulsion.

The oil composition used in the oil extension of the rubber will typically be employed at a level which is within the range of about 5 phr to 100 phr (parts per 100 parts of rubber by weight). In other words, from about 5 phr to about 100 phr of the oil composition will be added to the rubber cement (in the case of solution polymers) or to the rubber emulsion (in the case of emulsion polymers). In most cases, the oil composition will be added at a level which is within the range of 6 phr to 80 phr. In many cases, the oil composition will be added at a level which is within the range of 8 phr to 60 phr. The oil composition will preferably be added at a level which is within the range of 10 phr to 40 phr.

It is typically desirable for the oil composition (extender oil material) to contain as much of the resin as can be effectively dispersed into the oil. In any case, the level of resin in the extender oil composition will normally be within the range of 10 weight percent to 60 weight percent (based upon the total weight of the resin and the oil in the extender oil composition). In most cases, the resin will be included in the extender oil composition at a level which is within the range of 20 weight percent to 55 weight percent. The oil will typically be heated to an elevated temperature to facilitate mixing of the resin into oil. In many cases it will be convenient to heat the oil to a temperature which is within the range of 50° C. to 130° C. to facilitate the mixing. It is typically convenient to heat the oil to a temperature which is within the range of 80° C. to 110° C. before mixing the resin therein.

The amount of extender oil composition added will typically be sufficient to produce an oil extended product that contains at least 5 phr of the oil and at least 5 phr of the resin. The maximum total level of extender oil composition that can be added is about 100 phr (the total weight of the oil and the resin will not normally exceed 100 phr). In most cases, the extender oil composition will not be added at a level of greater than about 80 phr. In most cases, the extender oil composition will be added at a level which will be sufficient to provide from 10 phr to 40 phr of the oil and from 5 phr to 30 phr of the resin in the oil extended rubber being made. It is typically preferred for the extender oil composition to be added at a level which will be sufficient to provide from 15 phr to 35 phr of the oil and from 8 phr to 20 phr of the resin in the oil extended rubber being made. It is typically more preferred for the extender oil composition to be added at a level which will be sufficient to provide from 20 phr to 30 phr of the oil and from 10 phr to 15 phr of the resin in the oil extended rubber being made.

The oil used in making the resin modified oil extended rubber can be a petroleum based oil, such as a highly aromatic oil, an aromatic oil, a naphthenic oil, a paraffinic oil, or a mixture thereof. The petroleum based oil utilized can be Type 101, Type 102, Type 103, or Type 104 as delineated by ASTM Designation D2226 or a mixture thereof. Low PCA oils, such as MES, TDAE, and heavy naphthenic oils can also be used. Suitable low PCA oils include, but are not limited, to mild extraction solvates (MES), treated distillate aromatic extracts (TDAE), and heavy naphthenic oils as are known in the art and further described in U.S. Pat. Nos. 5,504,135, 6,103,808, 6,399,697, 6,410,816, 6,248,929, 6,146,520, United States Patent Publication 2001/00023307, United States Patent Publication 2002/0000280, United States Patent Publication 2002/0045697, United States Patent Publication 2001/0007049, EP0839891, JP2002097369, and ES2122917 which are incorporated herein by reference for the purpose of disclosing suitable oils. Generally, suitable oils include low PCA oils include those having a glass transition temperature Tg in a range of from about −40° C. to about −80° C., MES oils generally have a Tg in a range of from about −57° C. to about −63° C., TDAE oils generally have a Tg in a range of from about −44° C. to about −50° C., heavy naphthenic oils generally have a Tg in a range of from about −42° C. to about −48° C. A suitable measurement for Tg of TDAE oils is DSC according to ASTM E1356, or equivalent thereto.

Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. In one embodiment, the low PCA oils may be an MES, TDAE or heavy naphthenic types having characteristics as identified in the following table:

|  | MES | TDAE | Heavy Naphthenic |
|---|---|---|---|
| Aromatics | 11% to 17% | 25% to 30% | 11% to 17% |
| Specific Gravity @15° C. | 0.895-0.925 kg/l | 0.930-0.960 kg/l | 0.920-0.950 kg/l |
| Viscosity @40° C. | 150-230 cSt | 370-430 cSt | 350-820 |
| Viscosity @100° C. | 13-17 cSt | 16-22 cSt | 17-33 cSt |
| Refractive Index | 1.495-1.510 | 1.520-1.540 | 1.500-1.520 |
| Tg Inflection | −60° C. ± 3° C. | −47° C. ± 3° C. | −45° C. ± 3° C. |
| Aniline Point | 85° C.-100° C. | | |
| Pour Point | 0° C. maximum | 30° C. maximum | 0° C. maximum |
| DMSO [IP 346] | <2.9% | <2.9% | <2.9% |
| Flashpoint | >220° C. | >240° C. | >240° C. |

In one embodiment, the low PCA oils may be an MES type that is a complex combination of hydrocarbons predominantly comprised of saturated hydrocarbons in the range of $C_{20}$ to $C_{50}$ obtained by (1) solvent extraction of heavy petroleum distillate; or (2) treating of heavy petroleum distillate with hydrogen in the presence of a catalyst; followed by solvent dewaxing. In one embodiment, the low PCA oil contains not more than 1 mg/kg of benzo(a)pyrene, and not more than 10 mg/kg total of the following polycyclic aromatic hydrocarbons: benzo(a)pyrene, benzo(e)pyrene, benzo(a)anthracene, benzo(b)fluoranthene, benzo(j)fluoranthene, benzo(k)fluoranthene, dibenzo(a,h)anthracene, and chrysene. Suitable TDAE oils are available as Tudalen SX500 from Klaus Dahleke KG, VivaTec 400 and VivaTec 500 from H&R Group, and Enerthene 1849 from BP, and Extensoil 1996 from Repsol. The oils may be available as the oil alone or along with an elastomer in the form of an extended elastomer.

In the practice of this invention it is preferred of the oil to be a triglyceride oil, such as a vegetable oil. The following table lists a number of triglyceride oils that can be utilized and shows the saturation, mono-unsaturation and poly-unsaturation contents of these vegetable oils (triglyceride oils). It is preferred for the vegetable oil used to have an iodine value of less than 135 and preferably less than 130.

| Vegetable Oil | Saturated | Mono Unsaturated | Poly Unsaturated |
|---|---|---|---|
| Soybean | 16% | 45% | 40% |
| Canola (Rapeseed) | 7% | 63% | 28% |
| Corn | 13% | 28% | 55% |
| Coconut | 87% | 6% | 2% |
| Cottonseed | 26% | 18% | 52% |
| Olive | 14% | 73% | 11% |
| Palm | 49% | 37% | 9% |
| Peanut | 17% | 46% | 32% |
| Safflower | 10% | 45% | 40% |

Genetically modified soybeans can also be used as the source of soybean oil that is employed in the practice of this invention. Such soybean oil has a much higher oleic acid content and is sometimes referred to as high oleic acid soybean oil (HOSBO). In any case, HOSBO typically contains about 74.5% oleic acid.

In cases where oil extended emulsion polymers are being made the oil will normally be emulsified into an oil-in-water emulsion. The water used in making the oil-in water emulsion will preferably have a low content of dissolved minerals, such a ion-exchange water and/or distilled water. The surfactant used in making the emulsion should have good compatibility with the oil and the water. In any case, it is preferred to utilize a nonionic surfactant because of their high affinity for oils, such a triglyceride oils. Among nonionic surfactants, some of these have cloud points, and from the viewpoint of easiness of coagulation, a nonionic surfactant having a comparatively low cloud point is preferable. Herein, a cloud point is referred to as a temperature at which a nonionic surfactant becomes insoluble in water, and the temperature at this time is called a cloud point since the solution turns to white turbidity.

The nonionic surfactants used in the present invention have a hydrophilic part (A) and a lipophilic part (B). As for the hydrophilic part (A), a polyoxyethylene compound having a recurring unit of an oxyethylene chain of ($—CH_2—CH_2—O—$) is used from the viewpoint their affinity for oils, such as vegetable oils is high. The number n of recurring units of an oxyethylene chain in the hydrophilic part (A) is preferably not less than 2, more preferably not less than 4, further more preferably not less than 5. When n of the hydrophilic part (A) is less than 2, there is a tendency that the compound is not dissolved in water. The number n of the hydrophilic part (A) is preferably not more than 40, more preferably not more than 30, further more preferably not more than 20. When n of the hydrophilic part (A) is more than 40, emulsification ability is deteriorated and there is a tendency that a stable emulsion cannot be prepared.

The lipophilic part (B) is preferably an alkyl ether and/or alkenyl ether from the viewpoint that affinity with a oils and particularly vegetable oils is high. Examples of alkyl ether are lauryl ether, cetyl ether, and stearyl ether, and alkyl ether which can be used in the present invention is not limited only to these examples. In addition, alkyl vinyl ether having a different number of carbon atoms may be blended. An example of alkenyl ether is oleyl ether. Examples of a surfactant satisfying the above-described conditions are, for instance, polyoxyethylene alkyl ether, sorbitan fatty acid ester, polyoxyethylene sorbitan fatty acid ester, polyoxyethylene sorbitol fatty acid ester, glycerin fatty acid ester, polyoxyethylene fatty acid ester, and polyoxyethylene hydrogenated castor oil, and these surfactants may be used alone, or at least two kinds thereof may be used in combination. Among the above-described surfactants, examples of sorbitan fatty acid ester are, for instance, sorbitan monolaurate, sorbitan monopalmitate, sorbitan monostearate, sorbitan tristearate, sorbitan monooleate, sorbitan trioleate, and polyoxyethylene sorbit tetraoleate.

To enhance stability of the emulsion, an anionic surfactant or a cationic surfactant can be used in combination of nonionic surfactants. Examples of an anionic surfactant are, for instance, salt of alkyl sulfate, salt of polyoxyethylene alkyl ether sulfate, alkyl benzene sulfonate, fatty acid salt, and condensate of formalin and naphthalene sulfonate. The specific type of anionic surfactant or a cationic surfactant, and combination with a nonionic surfactant may be suitably selected with the type of oil being used in mind. The ratio thereof also may be suitably selected according to kind of oil and type of surfactant system being used.

A content of surfactant in an emulsion comprising an oil, water and the surfactant is preferably not less than 0.1% by weight, more preferably not less than 0.3% by weight. When the content of surfactant is less than 0.1% by weight, there is a tendency that stability of the emulsion is insufficient. The content of surfactant is preferably not more than 10% by weight, more preferably not more than 8% by weight. When the content of surfactant is more than 10% by weight, there is a tendency that the surfactant is easily remained in a rubber, and besides water absorbing property is imparted to the rubber to lower rubber physical properties, and a cost thereof is increased.

The oil-in water emulsion can be made utilizing standard equipment and conventional techniques which are known in the art. More specifically the oil, the surfactant and water are typically mixed with a high speed stirring equipment such as a homogenizer to disperse the oil with a fine particle diameter in water, and thus the oil-in-water type emulsion can be prepared. The number of rotations of the high speed stirring equipment is preferably not less than 1,000 rpm, more preferably not less than 2,000 rpm. When the number of rotations of the high speed stirring equipment is less than 1,000 rpm, there is a tendency that oil drops with sufficiently fine particle diameters cannot be obtained.

A mixing time with the high speed stirring equipment is preferably not less than 3 minutes, more preferably not less than 5 minutes. When the mixing time with the high speed stirring equipment is less than 3 minutes, there is a tendency that a sufficiently stable emulsion cannot be obtained. The mixing time with the high speed stirring equipment is preferably not more than 5 hours, more preferably not more than 3 hours. When the mixing time with the high speed stirring equipment is more than 5 hours, no effect resulted from continuous stirring can be obtained, and thus there is a tendency that productivity is lowered.

The resins used in the practice of this invention typically have a Tg greater than 30° C. The resin can be selected from the group consisting of hydrocarbon resins, phenol/acetylene resins, terpene phenol resins, rosin derived resins and mixtures thereof. Representative hydrocarbon resins include coumarone-indene-resins, petroleum resins, terpene polymers, alphamethyl styrene resins and mixtures thereof. Coumarone-indene resins are commercially available in many forms with melting points ranging from 10 to 160° C. (as measured by the ball-and-ring method). Preferably, the melting point will be within the range of 30° C. to 100° C. Coumarone-indene resins are comprised of a large amount of polyindene. However, coumarone-indene resins typically contain random polymeric units derived from methyl indene, coumarone, methyl coumarone, styrene and methyl styrene.

Petroleum resins are commercially available with softening points ranging from 10° C. to 120° C. Preferably, the softening point of petroleum resins will be within the range of 30° C. to 100° C. Suitable petroleum resins include both aromatic and nonaromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include dicyclopentadiene, cyclopentadiene, their dimers and diolefins such as isoprene and piperylene.

Terpene polymers are typically commercially produced from polymerizing a mixture of alpha-pinene and beta-pinene in mineral spirits. The resin is usually supplied in a variety of melting points ranging from 10° C. to 135° C. Phenol/acetylene resins can also be used. Phenol/acetylene resins may be derived by the addition of acetylene to butyl phenol in the presence of zinc naphthenate. Additional examples are derived from alkylphenol and acetylene.

Terpene-phenol resins can also be used. Terpene-phenol resins may be derived by copolymerization of phenolic monomers with terpenes such as limonenes and pinenes. Resins derived from rosin and derivatives may be used in the present invention. Gum and wood rosin have much the same composition, although the amount of the various isomers may vary. They typically contain about 10 percent by weight neutral materials, 53 percent by weight resin acids containing two double bonds, 13 percent by weight of resin acids containing one double bond, 16 percent by weight of completely saturated resin acids and 2 percent of dehydroabietic acid which contains an aromatic ring but no unsaturation. There are also present about 6 percent of oxidized acids. Representative examples of the diunsaturated acids include abietic acid, levopimaric acid and neoabietic acid. Representative examples of the monounsaturated acids include dextroplmaris acid and dihydroabietic acid. A representative saturated rosin acid is tetrahydroabietic acid.

In one embodiment, the resin is derived from styrene and alpha-methylstyrene. It is considered that, in one aspect, its glass transition temperature (Tg) characteristic combined with its molecular weight (Mn) and molecular weight distribution (Mw/Mn) provides a suitable compatibility of the resin in the rubber composition, the degree of compatibility being directly related to the nature of the rubber composition. The presence of the styrene/alpha-methylstyrene resin with a rubber blend which contains the presence of the styrene-butadiene elastomer is considered herein to be beneficial because of observed viscoelastic properties of the tread rubber composition such as complex and storage modulus, loss modulus tan delta and loss compliance at different temperature/frequency/strain as hereinafter generally described. The properties of complex and storage modulus, loss modulus, tan delta and loss compliance are understood to be generally well known to those having skill in such art. They are hereinafter generally described.

The molecular weight distribution of the resin is visualized as a ratio of the resin's molecular weight average (Mw) to molecular weight number average (Mn) values and is considered herein to be in a range of about 1.5/1 to about 2.5/1 which is considered to be a relatively narrow range. This believed to be advantageous because of the selective compatibility with the polymer matrix and because of a contemplated use of the tire in wet and dry conditions over a wide temperature range.

The glass transition temperature (Tg) of the copolymer resin is considered herein to be in a range of about 20° C. to about 100° C., alternatively about 30° C. to about 80° C., depending somewhat upon an intended use of the particular resin modified oil extended rubber. A suitable measurement of Tg for resins is DSC according to ASTM D6604 or equivalent.

The styrene/alpha-methylstyrene resin is considered herein to be a relatively short chain copolymer of styrene and alpha-methylstyrene with a styrene/alpha-methylstyrene molar ratio in a range of about 0.40 to about 1.50. In one aspect, such a resin can be suitably prepared, for example, by cationic copolymerization of styrene and alpha-methylstyrene in a hydrocarbon solvent. Thus, the contemplated styrene/alpha-methylstyrene resin can be characterized, for example, by its chemical structure, namely, its styrene and alpha-methylstyrene contents and softening point and also, if desired, by its glass transition temperature, molecular weight and molecular weight distribution.

In one embodiment, the styrene/alpha-methylstyrene resin is composed of about 40 to about 70 percent units derived from styrene and, correspondingly, about 60 to about 30 percent units derived from alpha-methylstyrene. In one embodiment, the styrene/alpha-methylstyrene resin has a softening point according to ASTM No. E-28 in a range of about 80° C. to about 145° C. Suitable styrene/alpha-methylstyrene resin is available commercially as Resin 2336 from Eastman or Sylvares SA85 from Arizona Chemical.

Virtually any type of high molecular weight synthetic rubber can be oil extended and resin modified in accordance with this invention. For example, solution styrene-butadiene rubber (SSBR), emulsion styrene-butadiene rubber (ESBR), polybutadiene rubber, synthetic polyisoprene rubber, ethylene-propylene-diene rubber (EPDM), isoprene-butadiene rubber, styrene-isoprene-butadiene rubber, silicon rubber, nitrile rubber, carboxylated nitrile rubber, and the like can be resin modified and simultaneously oil extended in accordance with the method of this invention. It is of particular value in making resin modified solution styrene-butadiene rubber (SSBR), emulsion styrene-butadiene rubber (ESBR), high cis-1.4-polybutadiene rubber, and synthetic polyisoprene rubber which are formulated for use in tire tread compounds.

High cis-1,4-polybutadiene rubber which is resin modified and oil extended in accordance with this invention can be synthesized with a nickel based catalyst system in accordance with the teachings of U.S. Pat. No. 4,983,695. This method involves polymerizing 1,3-butadiene in a solution of an aliphatic and/or cycloaliphatic solvent system employing as a catalyst system a mixture of (1) an organonickel compound, (2) an organoaluminim compound and (3) a fluorine containing compound selected from the group consisting of hydrogen fluoride and hydrogen fluoride complexes prepared by complexing hydrogen fluoride with ketones, esters, ethers, alcohols, phenols and water, said polymerization being conducted in the presence of small amounts of an alpha olefin, such as ethylene or propylene. This technique more specifically involves synthesizing high cis-1,4-polybutadiene by polymerizing 1,3-butadiene in a solution of an aliphatic and/or cycloaliphatic solvent system employing as a catalyst system, a mixture of (1) a nickel salt of a carboxylic acid, (2) a trialkylaluminum compound, and (3) a fluorine containing compound prepared by complexing hydrogen fluoride with ethers; wherein the mole ratio of said trialkylaluminum compound to said nickel salt of a carboxylic acid ranges from about 0.3/1 to about 300/1, wherein the mole ratio of said fluorine containing compound to said nickel salt of a carboxylic acid ranges from about 0.5/1 to about 500/1, and wherein the mole ratio of the fluorine containing compound to the trialkylaluminum compound ranges from about 0.4/1 to about 15/1; said polymerization being conducted in the presence of 0.73 to 4.57 phm of propylene. A more detailed description of nickel based catalyst systems that can be used in the synthesis of high cis-1,4-polybutadiene rubber is provided in Canadian Patent 1,284,545. The teachings of Canadian Patent 1,284,545 are incorporated herein by reference for the purpose of disclosing such nickel based catalyst systems.

The high cis-1,4-polybutadiene can also be synthesized utilizing the method described in U.S. Pat. No. 5,698,643. This method comprises polymerizing 1,3-butadiene monomer in a solution of hexane at a temperature of about 65° C. employing as a catalyst system, a mixture of (1) nickel octanoate, (2) triisobutylaluminum and (3) a hydrogen fluoride complex which is prepared by complexing hydrogen fluoride with dibutyl ether, wherein the mole ratio of said triisobutylaluminum to said nickel octanoate is about 40:1, wherein the mole ratio of the hydrogen fluoride complex to said nickel octanoate is about 105:1, and wherein the mole ratio of the hydrogen fluoride complex to the triisobutylaluminum is about 2.6:1, said polymerization being conducted in the presence of 2 to 15 phm of isobutene which acts as a molecular weight regulator to reduce the molecular weight of the high cis-1,4-polybutadiene.

The high cis-1,4-polybutadiene can also by synthesized in accordance with the teachings of U.S. Pat. No. 5,451,646. This method comprises polymerizing 1,3-butadiene in the presence of (a) an organonickel compound, (b) an organoaluminum compound, (c) a fluorine containing compound, and (d) para-styrenated diphenylamine; wherein the organoaluminum compound and the fluorine containing compound are brought together in the presence of the para-styrenated diphenylamine. The teaching of U.S. Pat. Nos. 4,983,695, 5,698,643 5,451,646 are incorporated herein by reference.

The high cis-1,4-polybutadiene can also by synthesized utilizing a rare earth metal catalyst system. For instance, the use of rare earth metal compounds as components of organometallic mixed catalyst systems for the stereospecific polymerization of 1,3-butadiene monomer into high cis-1, 4-polybutadiene is disclosed by U.S. Pat. No. 4,260,707. The catalyst system disclosed in U.S. Pat. No. 4,260,707 is comprised of (a) a reaction mixture formed by reacting a rare earth carboxylate and an aluminum compound wherein there are three hydrocarbon residues having from 1 to 20 carbon atoms attached to the aluminum, (b) a trialkyl aluminum and/or a dialkyl aluminum hydride and (c) a Lewis acid. An improved process for preparing conjugated diolefin polymers or copolymers having a high content of 1,4-cis-units and high chain linearity is disclosed in U.S. Pat. No. 4,444,903. In this process a catalytic system prepared from (a) at least one carboxylate or alcoholate of a rare earth element, (b) a tertiary organic halide and (c) an organo metallic aluminum compound not containing halide ions of the formula: $R_aR_bAlR_c$ in which $R_a$ and $R_b$ are alkyl residues and $R_c$ is hydrogen atom or an alkyl radical. Another example of the use of an organometallic mixed catalyst system containing a rare earth compound for producing a conjugated diene polymer is disclosed in U.S. Pat. No. 4,461,883. This process is characterized by polymerizing at least one conjugated diene with a catalyst consisting of (A) a reaction product of a Lewis base and a carboxylate of a rare earth element of the lanthanum series represented by $AlR_2R_3 R_4$, wherein $R_2$, $R_3$, and $R_4$ which may be the same or different represent hydrogen or alkyl substituents, although $R_2$, $R_3$, and $R_4$ cannot all be hydrogen atoms and (C) an alkyl aluminum, and (D) optionally, a conjugated diene. The lanthanum based catalyst system can also be comprised of (1) a compound of a lanthanum series rare earth metal, (2) an organoaluminum compound, and (3) a halogen containing compound. The compounds of lanthanum series rare earth metal include carboxylates, alkoxides, thioalkoxides, halides, amides and the like of elements having an atomic number which is within the range of 57 to about 71, such as cerium, lanthanum, praseodymium, neodymium and gadolinium. Some representative examples of sources for the carboxylate, alkoxide or thioalkoxide octanoic acid, 2-ethylhexanoic acid, oleic acid, stearic acid, benzoic acid, naphthenic acid, 2-ethyl-hexylalcohol, oleyl alcohol, phenol, benzyl alcohol, thiophenol, and the like. In any case, the rare earth metal may be used alone or in a combination of two or more additional rare earth metals. In order to solubilize the compound of the lanthanum series rare earth element into a polymerization catalyst system, this compound may be used as a mixture or a reaction product with the Lewis base and/or Lewis acid, if necessary. Typically the use of a Lewis base is preferable. Some representative examples of Lewis bases that can be utilized include acetylacetone, tetrahydrofuran, pyridine, N,N'-dimethyl formamide, thiophene, diphenyl ether, triethylamine, organic phosphorus compound, mono- or bivalent alcohol and the like. The organoaluminum compound will typically be a trialkyl aluminum compound, such as triethyl aluminum, triisobutyl aluminum, triisopropyl aluminum, trihexyl aluminum and the like. Among them, triethyl aluminum, triisobutyl aluminum and trihexyl aluminum, and the like. The halogen containing compound will typically be a fluorine or a chlorine containing compound, such boron trifluoride, a hydrogen fluoride complex which is prepared by complexing hydrogen fluoride with dialkyl ether, or a halogenated aluminum compound. Such catalyst systems are described in greater detail in U.S. Pat. No. 4,533,711 the teachings of which are incorporated herein by references for the purpose of disclosing useful catalyst systems.

In any case the high cis-1,4-polybutadiene rubber which is resin modified and oil extended in accordance with this invention can be characterized by being comprised of high cis-1,4-polybutadiene rubber having a cis-microstructure content of at least 90 percent, at least 5 phr of an oil, and at least 5 phr of a resin, wherein the high cis-1,4-polybutadiene rubber has a $M_z$ molecular weight of at least 750,000 Da, and wherein the high cis-1,4-polybutadiene rubber has a ratio of Mz molecular weight to number average molecular weight of at least 5. The high cis-1,4-polybutadiene rubber composition will typically have a $M_z$ molecular weight of at least 1,000,000 Da and will more typically have a $M_z$ molecular weight of at least 1,500,000 Da.

The high cis-1,4-polybutadiene rubber composition will more typically have a ratio of Mz molecular weight to number average molecular weight of at least 5.5 and will more typically have a ratio of Mz molecular weight to number average molecular weight of at least 6. The high cis-1,4-polybutadiene rubber can have a ratio of $M_z$ molecular weight to number average molecular weight of at least 6.1 and may have a ratio of $M_z$ molecular weight to number average molecular weight of at least 6.2.

The high cis-1,4-polybutadiene rubber will more typically have a cis-microstructure content of at least 94 percent and more frequently will have a cis-microstructure content of at least 95 percent. In many cases the high cis-1,4-polybutadiene rubber will have a cis-microstructure content of at least 96 percent, at least 97 percent, or even as high as at least 98 percent. In some cases, the high cis-1,4-polybutadiene rubber will have a polydispersity of at least 2.3 and may have a polydispersity of at least 2.4.

Resin modified oil extended synthetic polyisoprene rubber compositions made in accordance with this invention can be characterized by being comprised of high cis-polyisoprene rubber having a cis-microstructure content of at least 90 percent, at least 5 phr of an oil, and at least 5 phr of a resin, wherein the high cis-polyisoprene rubber has a $M_z$ molecular weight of at least 750,000 Da, and wherein the high cis-polyisoprenebutadiene rubber has a ratio of $M_z$ molecular weight to number average molecular weight of at least 2.7. The high cis-polyisoprene rubber will frequently have a $M_z$ molecular weight of at least 1,000,000 Da and will typically have a $M_z$ molecular weight of at least 1,200,000 Da. In many cases the high cis-polyisoprene rubber will have a $M_z$ molecular weight of at least 1,400,000 Da and may have a $M_z$ molecular weight of at least 1,500,000 Da.

The high cis-polyisoprene rubber will typically have a ratio of $M_z$ molecular weight to number average molecular weight of at least 2.8 or at least 2.9. In many cases, the high cis-polyisoprene rubber will have a ratio of $M_z$ molecular weight to number average molecular weight of at least 3.0 and will frequently have a ratio of Mz molecular weight to number average molecular weight of at least 3.1. The high cis-1,4-polyisoprene rubber will typically have a polydispersity of at least 1.8 and more commonly at least 1.85. In many cases, the high cis-1,4-polyisoprene rubber has a polydispersity of at least 1.9.

The high cis-polyisoprene rubber can be neodymium polyisoprene rubber having a cis-microstructure content of at least 95 percent or at least 96 percent. In many cases the neodymium polyisoprene rubber will have a cis-microstructure content which is within the range of 96 percent to 98 percent, a trans-microstructure content of less than 0.5 percent, and a 3,4-microstructure content which is within the range of 2 percent to 4 percent. The neodymium polyisoprene rubber can be synthesized with a catalyst system three component catalyst system which includes (1) an organoaluminum compound, (2) an organoneodymium compound, and (3) at least one compound that contains at least one labile halide ion. Such a neodymium catalyst system is described in U.S. Pat. No. 6,780,948 the teachings of which are incorporated herein by reference. This patent describes a process for the synthesis of polyisoprene rubber which comprises polymerizing isoprene monomer in the presence of a neodymium catalyst system, wherein the neodymium catalyst system is prepared by (1) reacting a neodymium carboxylate with an organoaluminum compound in the presence of isoprene for a period of about 10 minutes to about 30 minutes to produce neodymium-aluminum catalyst component, and (2) subsequently reacting the neodymium-aluminum catalyst component with a dialkyl aluminum chloride for a period of at least 30 minutes to produce the neodymium catalyst system.

The synthetic polyisoprene rubber can also be a titanium polyisoprene rubber having a cis-microstructure content of at least 96 percent or 97 percent. For instance, the titanium polyisoprene rubber can have a cis-microstructure content which is within the range of 97 percent to 99 percent and a trans-microstructure content which is within the range of 1 percent to 3 percent. In some cases, the titanium polyisoprene rubber will have a 3,4-microstructure content which is within the range of 0.2 percent to 0.8 percent.

The synthetic polyisoprene rubber can also be lithium polyisoprene rubber having a cis-microstructure content of at least 86 percent. In many cases the lithium polyisoprene rubber will have a cis-microstructure content which is within the range of 88 percent to 92 percent, a trans-microstructure content which is within the range of 5 percent to 8 percent, and a 3,4-microstructure content which is within the range of 3 percent to 4 percent.

Resin modified oil extended emulsion styrene-butadiene rubber compositions made in accordance with this invention can be characterized by being comprised an emulsion styrene-butadiene rubber, a at least 5 phr of an oil, and at least 5 phr of a resin, wherein the emulsion styrene-butadiene rubber has a bound styrene content which with is within the range of 22 percent to 60 weight percent and a bound butadiene content which is within the range of 40 weight percent to 78 weight percent, wherein 60 percent to 70 percent of the bound butadiene repeat units in the emulsion styrene-butadiene rubber are of trans 1,4-microstructure, wherein 13 percent to 23 percent of the bound butadiene repeat units in the emulsion styrene-butadiene rubber are of cis-microstructure, and wherein 12 percent to 22 percent of the bound butadiene repeat units in the emulsion styrene-butadiene rubber are of vinyl-microstructure, wherein the emulsion styrene-butadiene rubber has a $M_z$ molecular weight of at least 25,000 kDa, and wherein the emulsion styrene-butadiene rubber has a ratio of $M_z$ molecular weight to number average molecular weight of at least 150.

The emulsion styrene-butadiene rubber will typically have a bound styrene content which with is within the range of 22 percent to 60 weight percent and a bound butadiene content which is within the range of 40 weight percent to 78 weight percent. The emulsion styrene-butadiene rubber will more typically have a bound styrene content which with is within the range of 24 percent to 32 weight percent and a bound butadiene content which is within the range of 68 weight percent to 76 weight percent. The emulsion styrene-butadiene rubber will more typically have a bound styrene content which with is within the range of 27 percent to 30 weight percent and a bound butadiene content which is within the range of 70 weight percent to 73 weight percent. Typically, 62 percent to 68 percent of the bound butadiene repeat units in the emulsion styrene-butadiene rubber are of trans 1,4-microstructure, 15 percent to 21 percent of the bound butadiene repeat units in the emulsion styrene-butadiene rubber are of cis-microstructure, and 14 percent to 20 percent of the bound butadiene repeat units in the emulsion styrene-butadiene rubber are of vinyl-microstructure. More typically, 63 percent to 67 percent of the bound butadiene repeat units in the emulsion styrene-butadiene rubber are of trans 1,4-microstructure, 16 percent to 20 percent of the bound butadiene repeat units in the emulsion styrene-butadiene rubber are of cis-microstructure, and 15 percent to 19 percent of the bound butadiene repeat units in the emulsion styrene-butadiene rubber are of vinyl-microstructure. In many cases, 64 percent to 66 percent of the bound butadiene repeat units in the emulsion styrene-butadiene rubber are of trans 1,4-microstructure, 17 percent to 19 percent of the bound butadiene repeat units in the emulsion styrene-butadiene rubber are of cis-microstructure, and 16 percent to 18 percent of the bound butadiene repeat units in the emulsion styrene-butadiene rubber are of vinyl-microstructure.

The emulsion styrene-butadiene rubber will typically have a $M_z$ molecular weight of at least 15,000 kDa. More typically the emulsion styrene-butadiene rubber will have a $M_z$ molecular weight of at least 20,000 kDa or of at least 24,000 kDa. In some cases, the emulsion styrene-butadiene rubber will have a $M_z$ molecular weight of at least 26,000 kDa and in some cases of at least 28,000. The emulsion styrene-butadiene rubber will normally have a ratio of $M_z$ molecular weight to number average molecular weight of at least 50. In many cases the emulsion styrene-butadiene rubber will have a ratio of $M_z$ molecular weight to number average molecular weight of at least 60, at least 70, at least 80, at least 85, or at least 90. The emulsion styrene-butadiene rubber will typically have a polydispersity of at least 40. In many cases the emulsion styrene-butadiene rubber will have a polydispersity of at least 30, at least 35, at least 40, at least 45 or even at least 50.

Resin modified oil extended solution styrene-butadiene rubber compositions made in accordance with this invention can be characterized by being comprised a solution styrene-butadiene rubber composition which is comprised of a solution styrene-butadiene rubber, at least 5 phr of an oil, and at least 5 phr of a resin, wherein the solution styrene-butadiene rubber has a bound styrene content which with is within the range of 10 percent to 60 weight percent and a bound butadiene content which is within the range of 40 weight percent to 90 weight percent, wherein 25 percent to 55 percent of the bound butadiene repeat units in the solution styrene-butadiene rubber are of trans 1,4-microstructure, wherein 25 percent to 50 percent of the bound butadiene repeat units in the solution styrene-butadiene rubber are of cis-microstructure, and wherein 5 percent to 45 percent of the bound butadiene repeat units in the solution styrene-butadiene rubber are of vinyl-microstructure, wherein the solution styrene-butadiene rubber has a $M_z$ molecular weight of at least 800 kDa, and wherein the solution styrene-butadiene rubber has a ratio of Mz molecular weight to number average molecular weight of at least 1.58.

The solution styrene-butadiene rubber composition will typically have a bound styrene content which with is within the range of 24 percent to 32 weight percent and a bound butadiene content which is within the range of 68 weight percent to 76 weight percent. The solution styrene-butadiene rubber will frequently have a bound styrene content which with is within the range of 27 percent to 30 weight percent and a bound butadiene content which is within the range of 70 weight percent to 73 weight percent. Typically from 38 percent to 52 percent of the bound butadiene repeat units in the solution styrene-butadiene rubber will be of trans 1,4-microstructure, 28 percent to 48 percent of the bound butadiene repeat units in the solution styrene-butadiene rubber will be of cis-microstructure, and 6 percent to 30 percent of the bound butadiene repeat units in the solution styrene-butadiene rubber will be of vinyl-microstructure. More typically from 40 percent to 50 percent of the bound butadiene repeat units in the solution styrene-butadiene rubber will be of trans 1,4-microstructure, 30 percent to 46 percent of the bound butadiene repeat units in the solution styrene-butadiene rubber will be of cis-microstructure, and 8 percent to 28 percent of the bound butadiene repeat units in the solution styrene-butadiene rubber will be of vinyl-microstructure.

The solution styrene-butadiene rubber will typically have a $M_z$ molecular weight of at least 810 kDa. The solution styrene-butadiene rubber will more typically have a $M_z$ molecular weight of at least 820 kDa and will often a $M_z$ molecular weight of at least 830 kDa. In many cases the solution styrene-butadiene rubber will have a $M_z$ molecular weight of at least 835 kDa. It is sometimes preferred for the solution styrene-butadiene rubber to have a $M_z$ molecular weight of at least 840 kDa. The solution styrene-butadiene rubber will typically have a ratio of Mz molecular weight to number average molecular weight of at least 1.60. In many cases the solution styrene-butadiene rubber will have a ratio of Mz molecular weight to number average molecular weight of at least 1.62. The solution styrene-butadiene rubber will typically have a polydispersity of at least 1.30. In many cases the solution styrene-butadiene rubber will have a polydispersity of at least 1.31. The solution styrene-butadiene rubber will frequently have a polydispersity of at least 1.32.

The resin modified oil extended rubber can then be compounded with conventional rubber compounding materials and agents. The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, Page 304 (1930). The conventional silica may also be typically characterized by having a dibutylphthalate (DBP) absorption value in a range of about 100 to about 400, and more usually about 150 to about 300. The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

The vulcanizable rubber composition may include from about 5 to about 50 phr of carbon black. Commonly employed carbon blacks can be used as a conventional filler. Representative examples of such carbon blacks include N110, N121, N134, N220, N231, N234, N242, N293, N299, 5315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

The vulcanizable rubber composition may include both silica and carbon black in a combined concentration of from about 50 phr to about 150 phr, in any weight ratio of silica to carbon black. In one embodiment, the vulcanizable rubber composition includes both silica and carbon black in approximately the same weight amounts, i.e., a weight ratio of about 1:1. Other fillers may be used in the resin modified oil extended rubber compositions such as particulate fillers, including ultra high molecular weight polyethylene (UHMWPE), particulate polymer gels, such as those disclosed in U.S. Pat. Nos. 6,242,534; 6,207,757; 6,133,364; 6,372,857; 5,395,891; or 6,127,488, and plasticized starch composite filler, such as that disclosed in U.S. Pat. No. 5,672,639. The teachings of U.S. Pat. Nos. 6,242,534; 6,207,757; 6,133,364; 6,372,857; 5,395,891; 6,127,488, and 5,672,639 are incorporated herein by reference.

The resin modified oil extended rubber compositions of this invention may additionally contain a conventional sulfur containing organosilicon compound. Examples of suitable sulfur containing organosilicon compounds which may be used in accordance with the present invention include: 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclohexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl) trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compounds are 3,3'-bis(triethoxysilylpropyl)disulfide and 3,3'-bis(triethoxysilylpropyl)tetrasulfide. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT-Z™ from Momentive Performance Materials.

In another embodiment, suitable sulfur containing organosilicon compounds include compounds disclosed in United States Patent Application Publication No. 2006/0041063. In one embodiment, the sulfur containing organosilicon compounds include the reaction product of hydrocarbon based diol (e.g., 2-methyl-1,3-propanediol) with S-[3-(triethoxysilyl)propyl]thiooctanoate. In one embodiment, the sulfur containing organosilicon compound is NXT-Z™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The resin modified oil extended rubbers of this invention can be utilized in manufacturing a wide variety of products, such as tires, power transmission belts, conveyor belts, tracks, air springs, asphalt modification polymers, adhesives, shoe soles, windshield wiper blades, bowling balls, golf balls, energy absorbing foot pads, and the like. These resin modified rubbers can be incorporated in a number of tire components. For example, the resin modified oil extended rubbers of this invention can be utilized in tire treads (including tread outer cap layer and tread inner cap layer) and tire sidewalls. They can also be employed in tire apex, chafer, sidewall insert, wirecoat and innerliner formulations.

The pneumatic tire of the present invention may be a race tire, passenger tire, aircraft tire, agricultural, earthmover, off-the-road, truck tire, and the like. Generally, the tire will be a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the scope of the present invention. All parts are parts by weight unless specifically identified otherwise.

EXAMPLE 1

In this series of experiments, neodymium polybutadiene rubber (cis-polybutadiene rubber) was formulated utilizing a "wet mix" technique in accordance with the procedure of this invention as well as a "dry mix" technique wherein oil extended polymer and resin were added separately to a mixer. In the procedure used, the resin/oil extender used in making the "wet mix" was prepared by dissolving 1 part of the resin into 2 parts of the soybean oil at a temperature of 100° C. This mixing was carried out by vigorously mixing for a period of about 30 minutes. The soybean oil/resin mixture was then blended at a level of 37.5 phr into a neodymium polybutadiene rubber cement at room temperature for period of about 30 minutes. The cement was then drum dried to recover the resin modified neodymium polybutadiene rubber.

A dry mix was also prepared by first oil extending a neodymium polybutadiene rubber cement with 25 phr of soybean oil. The soybean oil extended neodymium polybutadiene rubber was then recovered by drum drying. The dried soybean oil extended neodymium polybutadiene rubber was then mixed for 1 minute in a 70 cc Brabender mixer at 60° C. at 60 rpm. Then, 12.5 phr of polyterpene resin was added to the mixer and mixing was continued for 5 minutes to prepare a dry mixed resin modified polybutadiene rubber.

The "wet mix" and "dry mix" rubbers were then characterized by asymmetric flow field flow fractionation (AF4) to determine number average, weight average and z-average molecular weights. In the procedure used to determine molecular weight values by AF4 the samples were prepared by dissolution in THF (BHT stabilized) to a concentration of 2.5 mg/ml and were allowed to stand at room temperature for 5 days with no mechanical agitation. After 5 days, the samples were gently agitated by hand to homogenize the solution. Samples were passed through a 5 μm PTFE filter prior to injection on AF4 instrumentation. The AF4 instrumentation consisted of an Agilent Technologies (Santa Clara, Calif.) 1260 Isocratic Pump and Autosampler, followed by separation with Eclipse AF4 from Wyatt Technology (Santa Barbara, Calif.) equipped with an Organic Long Channel using 350 W spacer and 10 kD Regenerated Cellulose membrane. Particle size and concentration measurements were made with a MALS-RI detector combination consisting of a Dawn Heleos-II and OptiLab T-rEX, both from Wyatt Technology (Santa Barbara, Calif.). THF (BHT stabilized) was used as the mobile phase throughout the system. Fractionation of the sample occurred under the following flow conditions. The analysis began with a 4 minute stabilization period at a 3.5 ml/min crossflow. The sample was injected (150 μl) into the channel over a 3 minute period at an injection flow rate of 0.2 ml/min and followed with a 10 minute focusing step to concentrate the material prior to fractionation. Sample elution began at the 17 minute mark, with an initial 3.5 ml/min constant crossflow for 5 minutes. The crossflow was then linearly decreased to 0 ml/min over 30 minutes, followed by a 17 minute hold at 0 ml/min. After data collection for 70 minutes, the crossflow was increased back to 3.5 ml/min in preparation for the next sample injection. A constant detector flow of 1 ml/min was maintained throughout the analysis. Molecular weight analysis was performed using ASTRA software from Wyatt Technology (Santa Barbara, Calif.).

Three molecular weight determinations were made for both the "wet mix" and "dry mix" rubbers and the average is reported in the following table.

|  | $M_n$ (kDa) | $M_w$ (kDa) | $M_z$ (kDa) | $M_w/M_n$ | $M_z/M_n$ |
| --- | --- | --- | --- | --- | --- |
| Dry mix | 260 ± 10 | 570 ± 10 | 1070 ± 10 | 2.16 | 4.08 |
| Wet mix | 260 ± 10 | 640 ± 10 | 1630 ± 70 | 2.49 | 6.34 |

As can be seen the ratio of Mz molecular weight to Mn molecular weight was much higher in the case where the wet mix procedure was used. This is indicative of less polymer breakdown and a retainment of higher molecular weight fractions in the case of the rubber made with the "wet mix" procedure of this invention. This in turn translates into better characteristics in final products such as tire tread formulations.

EXAMPLE 2

In this series of experiments, neodymium polyisoprene rubber (cis-polybutadiene rubber) was formulated utilizing a "wet mix" technique in accordance with the procedure of this invention as well as a "dry mix" technique wherein oil extended polymer and resin were added separately to a mixer. In the procedure used, the resin/oil extender used in making the "wet mix" was prepared by dissolving 1 part of the resin into 2 parts of the soybean oil at a temperature of 100° C. This mixing was carried out by vigorously mixing for a period of about 30 minutes. The soybean oil/resin mixture was then blended at a level of 37.5 phr into a neodymium polyisoprene rubber cement at room temperature for period of about 30 minutes. The cement was then drum dried to recover the resin modified neodymium polyisoprene rubber.

A dry mix was also prepared by first oil extending a neodymium polyisoprene rubber cement with 25 phr of soybean oil. The soybean oil extended neodymium polyisoprene rubber was then recovered by drum drying. The dried soybean oil extended neodymium polyisoprene rubber was then mixed for 1 minute in a 70 cc Brabender mixer at 60° C. at 60 rpm. Then, 12.5 phr of polyterpene resin was added to the mixer and mixing was continued for 5 minutes to prepare a dry mixed resin modified polyisoprene rubber.

The "wet mix" and "dry mix" rubbers were then characterized by asymmetric flow field flow fractionation to determine number average, weight average and z-average molecular weights. Three molecular weight determinations were made for both the "wet mix" and "dry mix" rubbers and the average is as reported in the following table.

|  | $M_n$ (kDa) | $M_w$ (kDa) | $M_z$ (kDa) | $M_w/M_n$ | $M_z/M_n$ |
| --- | --- | --- | --- | --- | --- |
| Dry mix | 570 ± 20 | 930 ± 10 | 1290 ± 30 | 1.64 | 2.27 |
| Wet mix | 510 ± 30 | 990 ± 30 | 1590 ± 40 | 1.94 | 3.13 |

As can be seen the ratio of Mz molecular weight to Mn molecular weight was much higher in the case where the wet mix procedure was used. This is indicative of less polymer breakdown and a retainment of higher molecular weight fractions in the case of the rubber made with the "wet mix" procedure of this invention. This in turn translates into better characteristics in final products such as tire tread formulations.

EXAMPLE 3

In this series of experiments, solution styrene-butadiene rubber was formulated utilizing a "wet mix" technique in accordance with the procedure of this invention as well as a "dry mix" technique wherein oil extended polymer and resin were added separately to a mixer. In the procedure used, the resin/oil extender used in making the "wet mix" was prepared by dissolving 1 part of the resin into 2 parts of the soybean oil at a temperature of 100° C. This mixing was carried out by vigorously mixing for a period of about 30 minutes. The soybean oil/resin mixture was then blended at a level of 37.5 phr into a solution styrene-butadiene rubber cement at room temperature for period of about 30 minutes. The cement was then drum dried to recover the resin modified solution styrene-butadiene rubber.

A dry mix was also prepared by first oil extending a solution styrene-butadiene rubber cement with 25 phr of soybean oil. The soybean oil extended solution styrene-butadiene rubber was then recovered by drum drying. The dried soybean oil extended solution styrene-butadiene rubber was then mixed for 1 minute in a 70 cc Brabender mixer at 60° C. at 60 rpm. Then, 12.5 phr of polyterpene resin was added to the mixer and mixing was continued for 5 minutes to prepare a dry mixed resin modified solution styrene-butadiene rubber.

The "wet mix" and "dry mix" rubbers were then characterized by asymmetric flow field flow fractionation to determine number average, weight average and z-average molecular weights. Two molecular weight determinations were made for both the "wet mix" and "dry mix" rubbers and the average is as reported in the following table.

|         | Mn (kDa)  | Mw (kDa)  | Mz (kDa)  | Mw/Mn | Mz/Mn |
|---------|-----------|-----------|-----------|-------|-------|
| Dry mix | 500 ± 20  | 660 ± 20  | 800 ± 10  | 1.32  | 1.59  |
| Wet mix | 520 ± 10  | 690 ± 10  | 840 ± 10  | 1.33  | 1.63  |

As can be seen the ratio of Mz molecular weight to Mn molecular weight was higher in the case where the wet mix procedure was used. This is indicative of less polymer breakdown and a retainment of higher molecular weight fractions in the case of the rubber made with the "wet mix" procedure of this invention. This in turn translates into better characteristics in final products such as tire tread formulations.

EXAMPLE 4

In this series of experiments, emulsion styrene-butadiene rubber was formulated utilizing a "wet mix" technique in accordance with the procedure of this invention as well as a "dry mix" technique wherein oil extended polymer and resin were added separately to a mixer. In the procedure used, the resin/oil extender used in making the "wet mix" was prepared by dissolving 1 part of the resin into 2 parts of the soybean oil at a temperature of 100° C. This mixing was carried out by vigorously mixing for a period of about 30 minutes. The soybean oil/resin mixture was emulsified at a temperature of 140° F. with a rosin acid/fatty acid soap mixture. Then the emulsified soybean oil/resin mixture was added at a level of 37.5 phr into an emulsion styrene-butadiene rubber latex at room temperature for a period of about 10 minutes. The latex was then coagulated with a salt/acid coagulant to recover the resin modified emulsion styrene-butadiene rubber. It was then oven dried at a temperature of 140° F.

A dry mix was also prepared by first oil extending the emulsion styrene-butadiene rubber latex with 25 phr of soybean oil using the same procedure as was utilized in the wet mix procedure. The soybean oil extended emulsion styrene-butadiene rubber was then recovered by coagulation of the latex. The dried soybean oil extended emulsion styrene-butadiene rubber was then mixed for 1 minute in a 70 cc Brabender mixer at 60° C. at 60 rpm. Then 12.5 phr of polyterpene resin was added to the mixer and mixing was continued for 5 minutes to prepare a dry mixed resin modified emulsion styrene-butadiene rubber.

The "wet mix" and "dry mix" rubbers were then characterized by asymmetric flow field flow fractionation to determine number average, weight average and z-average molecular weights. Two molecular weight determinations were made for both the "wet mix" and "dry mix" rubbers and the average is as reported in the following table.

|         | Mn (kDa)  | Mw (kDa)     | Mz (kDa)     | Mw/Mn | Mz/Mn |
|---------|-----------|--------------|--------------|-------|-------|
| Dry mix | 200 ± 22  | 3500 ± 400   | 9000 ± 1000  | 17.6  | 43.4  |
| Wet mix | 290 ± 50  | 11000 ± 2000 | 27700 ± 900  | 36.6  | 94.4  |

As can be seen the ratio of Mz molecular weight to Mn molecular weight was much higher in the case where the wet mix procedure was used. This is indicative of less polymer breakdown and retaining of higher molecular weight fractions in the case of the rubber made with the "wet mix" procedure of this invention. This in turn translates into better characteristics in final products such as tire tread formulations.

EXAMPLES 5-11

In this series of experiments resin modified oil extended rubbers made in accordance with the technique of this invention was cured and the characteristics of the cured rubbers made in rubbers were compared to those of rubbers made using conventional techniques. In the procedure used the rubber samples were prepared by blending the ingredients other than the sulfur curatives in the first non-productive mixing stage in an internal rubber mixer for about 4 minutes to temperature of 160° C. The resulting mixtures were subsequently individually mixed in a second non-productive mixing stage to a temperature of about 140° C. The rubber compositions were subsequently mixed in a productive mixing stage with the sulfur curatives comprised of the sulfur and sulfur cure accelerators for about 2 minutes to a temperature of about 115° C. The rubber compositions were each removed from the internal mixer after each mixing step and cooled to below 40° C. between each individual nonproductive mixing stage and before the final productive mixing stage.

| Ingredient | Level of Ingredients in parts by weight | | | | | | |
|---|---|---|---|---|---|---|---|
|  | E5 | E6 | E7 | E8 | E9 | E10 | E11 |
| Nd Polybutadiene (high cis) | 26 | 26 | 26 | 26 | 26 | 26 | 26 |
| Natural rubber | 38 | 38 | 38 | 38 | 38 | 38 | 38 |
| Emulsion SBR (non-oil extended)[1] | 36 |  | 36 |  |  |  |  |
| Emulsion SBR (37.5 phr HN oil extended)[2] |  | 49.5 |  |  |  |  |  |
| Emulsion SBR (25 phr HN oil - 12.5 phr resin extended)[3] |  |  |  | 49.5 |  |  |  |
| Emulsion SBR (30 phr soybean oil Extended)[4] |  |  |  |  | 48.6 | 48.6 |  |
| Emulsion SBR (25 phr soybean oil - 12.5 phr resin extended)[5] |  |  |  |  |  |  | 49.5 |
| Reinforcing Carbon Black | 70 | 70 | 70 | 70 | 70 | 70 | 70 |
| Polyterpene resin[6] | 15 | 15 | 19.5 | 15 |  | 15 | 15 |
| HN Oil | 13.5 |  | 9 |  |  |  |  |
| Soybean Oil |  |  |  |  | 17.7 | 2.7 |  |
| Stearic acid | 2.0 | 2.0 | 2.0 | 2.0 | 2.0 | 2.0 | 2.0 |

-continued

| Ingredient | Level of Ingredients in parts by weight | | | | | | |
|---|---|---|---|---|---|---|---|
| | E5 | E6 | E7 | E8 | E9 | E10 | E11 |
| Rubber antidegradants | 2.75 | 2.75 | 2.75 | 2.75 | 2.75 | 2.75 | 2.75 |
| Rubber makers Sulfur | 1.3 | 1.3 | 1.3 | 1.3 | 1.3 | 1.3 | 1.3 |
| Sulfenamide accelerators | 1.2 | 1.2 | 1.2 | 1.2 | 1.2 | 1.2 | 1.2 |
| Zinc oxide | 3.0 | 3.0 | 3.0 | 3.0 | 3.0 | 3.0 | 3.0 |
| Waxes | 1.5 | 1.5 | 1.5 | 1.5 | 1.5 | 1.5 | 1.5 |
| Total Parts by weight | 210.3 | 210.3 | 210.4 | 210.4 | 210.6 | 210.6 | 210.6 |
| Cured Properties (Samples were cured about 10 minutes at a temperature of about 170° C.) | | | | | | | |
| Shore A hardness at 23° C. | 59 | 62 | 60 | 62 | 56 | 59 | 61 |
| 300% Modulus (MPa) | 6.5 | 7.5 | 7.6 | 8.8 | 6.8 | 7.9 | 7.9 |
| Tensile Strength (MPa) | 18.1 | 19.9 | 19.2 | 21.6 | 19.6 | 20.7 | 20.5 |
| Elongation at Break | 621% | 594% | 597% | 581% | 637% | 608% | 594% |
| Tan Delta at 0° C. | 0.40 | 0.40 | 0.43 | 0.42 | 0.35 | 0.37 | 0.42 |
| G' at −20° C. | 10.7 | 10.5 | 12.3 | 12.4 | 6.2 | 8.4 | 10.4 |
| Rebound at 100° C. | 48.8% | 51.4% | 49.1% | 51.0% | 51.2% | 51.2% | 51.2% |
| Tan Delta at 100° C. | 0.227 | 0.217 | 0.219 | 0.211 | 0.211 | 0.210 | 0.212 |
| Grosch Wheel Abradability | 653 | 592 | 660 | 518 | 660 | 609 | 533 |

[1] Emulsion polymerized styrene butadiene copolymer rubber with a bound styrene content of 23.5, a Mooney ML1 + 4 at 100° C., viscosity of 44, and a Tg of −53° C.
[2] Emulsion polymerized styrene butadiene copolymer rubber with a bound styrene content of 23.5 with 37.5 phr of heavy naphthenic extended oil, a Mooney ML1 + 4 at 100° C. viscosity of 45, and a Tg of −54° C.
[3] Emulsion polymerized styrene butadiene copolymer rubber with a bound styrene content of 23.5 with 25 phr of heavy naphthenic extended oil and 12.5 phr of polyterpene traction resin, a Mooney ML1 + 4 at 100° C. viscosity of 48, and a Tg of −51° C.
[4] Emulsion polymerized styrene butadiene copolymer rubber with a bound styrene content of 23.5 with 30 phr of soybean extended oil, a Mooney ML1 + 4 at 100° C. viscosity of 45, and a Tg of −65° C.
[5] Emulsion polymerized styrene butadiene copolymer rubber with a bound styrene content of 23.5 with 25 phr of soybean extended oil and 12.5 phr of polyterpene traction resin, a Mooney ML1 + 4 at 100° C. viscosity of 42, and a Tg of −61° C.
[6] Polyterpene traction resin with softening point around 115° C. obtained as Sylvatraxx™ 4150 from Kraton.

It should be noted that tan delta at 0° C. (3% strain at a frequency of 10 Hz) is an excellent indicator of wet traction characteristics in tire tread formulations with higher tan delta values being associated with better traction characteristics. G' at −20° C. (3% strain at a frequency of 10 Hz) is an excellent indication of winter tire performance with lower values being associated with better winter performance characteristics. It should also be noted that for better tire rolling resistance that it is desirable to have higher rebound at 100° C. and lower tan delta values at 100° C. (10% strain at a frequency of 1 Hz). The Grosch wheel abradability test is a good predictor of tire abrasion characteristics with lower values being more desirable.

As can be seen from reviewing the results obtained in Examples 5-11 (E5-E11), the cured rubber samples made with the resin modified oil extended rubbers made in accordance with this invention (E8 and E11) had a more desirable combination of properties for use in manufacturing tire tread rubber formulations than do the other rubbers. More specifically these resin modified oil extended rubbers exhibited an excellent combination of tensile strength, tan delta at 0° C., rebound at 100° C., tan delta at 100° C., and Grosch wheel abradability. Accordingly, these resin modified oil extended rubbers had excellent tensile properties, abrasion resistance characteristics, predicted wet tire performance characteristics, and a lower level of predicted tire rolling resistance (which is indicative of better fuel economy).

While certain representative embodiments and details have been shown for the purpose of illustrating the subject invention, it will be apparent to those skilled in this art that various changes and modifications can be made therein without departing from the scope of the subject invention.

What is claimed is:

1. A method for preparing a resin modified oil extended rubber composition which comprises: (1) blending an oil composition into a rubber cement, wherein the resin modified oil extended rubber composition is comprised of an oil and a hydrocarbon resin, and (2) recovering the resin modified oil extended rubber from the rubber cement, wherein the oil is present at a level of at least 5 phr, wherein the resin is present at a level of at least 5 phr, wherein the resin modified oil extended rubber composition is comprised of a solution styrene-butadiene rubber compositions having a bound styrene content which is within the range of 10 percent to 60 weight percent and a bound butadiene content which is within the range of 40 weight percent to 90 weight percent, wherein 25 percent to 55 percent of the bound butadiene repeat units in the solution styrene-butadiene rubber are of trans 1,4-microstructure, wherein 25 percent to 50 percent of the bound butadiene repeat units in the solution styrene-butadiene rubber are of cis-microstructure, and wherein 5 percent to 45 percent of the bound butadiene repeat units in the solution styrene-butadiene rubber are of vinyl-microstructure, wherein the solution styrene-butadiene rubber has a $M_z$ molecular weight of at least 800 kDa, and wherein the solution styrene-butadiene rubber has a ratio of Mz molecular weight to number average molecular weight of at least 1.58.

2. The method of claim 1 wherein the oil is a triglyceride oil.

3. The method of claim 2 wherein the oil is void of petroleum oils.

4. The method of claim 2 wherein the triglyceride oil is selected from the group consisting of soybean oil, sunflower oil, canola (rapeseed) oil, corn oil, coconut oil, cottonseed oil, olive oil, palm oil, peanut oil, and safflower oil.

5. The method of claim 4 wherein the triglyceride oil is soybean oil.

6. The method of claim 1 wherein the resin modified oil extended rubber is recovered from the rubber cement by removal of an organic solvent.

7. The method of claim 1 wherein the hydrocarbon resin is selected from the group consisting of phenol/acetylene resin, terpene phenol resins, rosin derived resins, coumarone-indene resins, terpene polymer resins, and styrene/a-methylstyrene resins.

8. The method of claim 1 wherein the oil is present at a level which is within the range of 10 phr to 40 phr.

9. The method of claim 1 wherein the resin is a polyterpene resin.

10. The method of claim 1 wherein the solution styrene-butadiene rubber has a bound styrene content which with is within the range of 24 percent to 32 weight percent and a bound butadiene content which is within the range of 68 weight percent to 76 weight percent.

11. The method of claim 10 wherein from 38 percent to 52 percent of the bound butadiene repeat units in the solution styrene-butadiene rubber are of trans 1,4-microstructure, 28 percent to 48 percent of the bound butadiene repeat units in the solution styrene-butadiene rubber are of cis-microstructure, and 6 percent to 30 percent of the bound butadiene repeat units in the solution styrene-butadiene rubber are of vinyl-microstructure.

12. The method of claim 1 wherein the solution styrene-butadiene rubber has a bound styrene content which with is within the range of 27 percent to 30 weight percent and a bound butadiene content which is within the range of 70 weight percent to 73 weight percent.

13. The method of claim 12 wherein from 40 percent to 50 percent of the bound butadiene repeat units in the solution styrene-butadiene rubber are be of trans 1,4-microstructure, 30 percent to 46 percent of the bound butadiene repeat units in the solution styrene-butadiene rubber are of cis-microstructure, and 8 percent to 28 percent of the bound butadiene repeat units in the solution styrene-butadiene rubber are of vinyl-microstructure.

14. The method of claim 1 wherein the solution styrene-butadiene rubber has a $M_z$ molecular weight of at least 820 kDa.

15. The method of claim 1 wherein the solution styrene-butadiene rubber has a $M_z$ molecular weight of at least 830 kDa.

16. The method of claim 1 wherein the solution styrene-butadiene rubber has a $M_z$ molecular weight of at least 835 kDa.

17. The method of claim 1 wherein the solution styrene-butadiene rubber has a $M_z$ molecular weight of at least 840 kDa.

18. The method of claim 1 wherein the solution styrene-butadiene rubber has a ratio of Mz molecular weight to number average molecular weight of at least 1.60.

19. The method of claim 1 wherein the solution styrene-butadiene rubber has a ratio of Mz molecular weight to number average molecular weight of at least 1.62.

20. A method for preparing a resin modified oil extended rubber composition which comprises: (1) blending an oil composition into a rubber cement or a rubber emulsion, wherein the resin modified oil extended rubber composition is comprised of an oil and a hydrocarbon resin, and (2) recovering the resin modified oil extended rubber from the rubber cement or the rubber emulsion, wherein the oil is present at a level of at least 5 phr, wherein the resin is present at a level of at least 5 phr, wherein the resin modified oil extended rubber composition is comprised of a high cis-polyisoprene rubber having a cis-microstructure content of at least 90 percent, wherein the high cis-polyisoprene rubber has a M2 molecular weight of at least 750,000 Da, and wherein the high cis-1,4-polyisoprene rubber has a ratio of Mz molecular weight to number average molecular weight of at least 2.5.

21. A method for preparing a resin modified oil extended rubber composition which comprises: (1) blending an oil composition into a rubber emulsion, wherein the resin modified oil extended rubber composition is comprised of an oil and a hydrocarbon resin, and (2) recovering the resin modified oil extended rubber from the rubber emulsion, wherein the oil is present at a level of at least 5 phr, wherein the resin is present at a level of at least 5 phr, wherein the resin modified oil extended rubber composition is comprised of an emulsion styrene-butadiene rubber composition having a bound styrene content which is within the range of 22 percent to 60 weight percent and a bound butadiene content which is within the range of 40 weight percent to 78 weight percent, wherein 60 percent to 70 percent of the bound butadiene repeat units in the emulsion styrene-butadiene rubber are of trans 1,4-microstructure, wherein 13 percent to 23 percent of the bound butadiene repeat units in the emulsion styrene-butadiene rubber are of cis-microstructure, and wherein 12 percent to 22 percent of the bound butadiene repeat units in the emulsion styrene-butadiene rubber are of vinyl-microstructure, wherein the emulsion styrene-butadiene rubber has a $M_z$ molecular weight of at least 15,000 kDa, and wherein the emulsion styrene-butadiene rubber has a ratio of Mz molecular weight to number average molecular weight of at least 50.

22. The method of claim 21 wherein the rubber cement or the rubber emulsion is a rubber emulsion, and wherein the resin modified oil extended rubber is recovered from the rubber emulsion by removal of water.

* * * * *